March 11, 1958 R. E. MITCHELL 2,826,726
COORDINATED SONAR SYSTEMS WITH SECTOR SCAN CONTROL APPARATUS
Filed Nov. 13, 1953 3 Sheets-Sheet 1

INVENTOR.
ROBERT E. MITCHELL
BY
Reynolds, Beach & Christensen
ATTORNEYS

INVENTOR.
ROBERT E. MITCHELL
BY
Raynolds, Beach & Christensen
ATTORNEYS

INVENTOR.
ROBERT E. MITCHELL
BY
Reynolds, Beach & Christensen
ATTORNEYS

United States Patent Office 2,826,726
Patented Mar. 11, 1958

2,826,726

COORDINATED SONAR SYSTEMS WITH SECTOR SCAN CONTROL APPARATUS

Robert Ernest Mitchell, Kent, Wash., assignor to Minneapolis-Honeywell Regulator Company, Minneapolis, Minn., a corporation of Delaware Application November 13, 1953, Serial No. 391,967

15 Claims. (Cl. 318—29)

This invention relates to apparatus for producing continuous reciprocation of a driven element between variably spaced positions, and more particularly concerns an improved means for producing and controlling sector scan in sonar devices. The invention is herein illustratively described by reference to its presently preferred embodiments, but it will be appreciated that it is not limited to the described details nor to the illustrated mode of application thereof. Certain features of the sector scan control apparatus herein described are disclosed and claimed in the copending application, Serial No. 386,988, filed October 19, 1953, of Willis H. Gille and Robert E. Mitchell, now United States Patent Number 2,776,396, issued January 1, 1957, and entitled Sector Scan Control Circuit.

Underwater sonar devices of the pulse-echo type for continuous search purposes are employed to greatest advantage when the transducer is caused to execute sector scan as distinguished from continuous 360-degree scan. There are various reasons for this. The wake of a vessel underway contains masses of air bubbles practically blocking energy propagation through a wide sector angle to the rear of the vessel. Also the maximum permissible angular scan rate of a sonar device, even at high pulse repetition rates corresponding to short ranges must be slow compared to that permitted in radar due to the relatively slow propagation of compressional wave energy in water. With a continuous 360-degree scan the time required for a complete scan may be so great with respect to the relative speed of the vessel and surrounding objects being detected that the indicator display (i. e. PPI or other type) of corresponding signal images on successive scans tends to be confusing. It is therefore desirable to concentrate the search in a limited sector of particular interest and thereby permit a relatively high angular scan frequency. It is also desirable for greatest utility of the sonar device that the scan sector width, direction relative to the heading of the vessel, and the scanning rate be made variable, subject to control by the operator.

A broad object of the present invention is a relatively simple and reliable sector scan control circuit achieving those ends without requiring physically movable sector limit or reversing switches, or complex relaying circuits which in prior devices added considerably to the bulk, complexity and cost of a sonar, especially if provisions were to be made therein for controlling the sector scan rate, width and direction. A related object is a sector scan control apparatus which is relatively easy to calibrate or adjust.

Still another object is a relatively compact sector scan control circuit in which the principal control means establishing the sector scan width, rate and direction may be mounted conveniently with those components of the sonar device which are located "above deck" or at some readily accessible position in the vessel. With this improved control circuit only a minimum of apparatus need be mounted "below" in direct physical association with the transducer mechanism.

As herein described the improved sector scan control circuit operates by applying progressive unbalance voltages to a normally balanced bridge circuit controlling energization of servo mechanism driving the transducer. This normally balanced bridge circuit includes a follow-up potentiometer mechanically driven by the servo mechanism in a sense to restore bridge circuit balance, the potentiometer output constituting positional error voltage acting in opposition to the progressive unbalance voltages referred to above. In one illustrated embodiment such progressive unbalance voltages are generated in the bridge circuit by constant speed potentiometer means, herein referred to as the "round and round" potentiometer, including a winding, a wiper cooperating therewith, and means effecting unidirectional relative rotation between such winding and said wiper. The potentiometer winding has a plurality of pairs of energizing taps arranged at interval spacings therearound, and an even number of these taps are connected with alternately opposite polarity to a voltage source which is selectively adjustable in order to vary the magnitude or amplitude of voltage applied to the potentiometer taps, depending upon whether D. C. or alternating voltages are applied thereto. In the example alternating voltage is applied to the potentiometer winding taps, whereby the potential of the continuously rotated potentiometer wiper becomes an alternating voltage, amplitude modulated in triangular wave form, and reversed in phase every half-cycle of the triangular wave. Selector switch means interposed within the circuit between the voltage source and the potentiometer energizing taps permits selecting the number of taps so energized and thereby constitutes a highly simple and convenient means for adjusting the triangular modulation wave frequency, which determines the sector scan frequency. The particular feature of an endless potentiometer winding to generate such unbalance voltages in combination with a servo system, is embodied in the claims in the aforesaid Gille and Mitchell Patent No. 2,776,396.

In a second illustrated embodiment the above-mentioned progressive unbalance voltages are generated in a bridge circuit by means of a drive control potentiometer, the wiper of which is reciprocated continuously between predetermined limits by means of an automatic reversing drive. In this embodiment the resultant triangular modulation wave frequency is not varied.

For the same reason that 360-degree continuous scan with sonar is often too slow in many cases, sector scan through a very wide angle may involve excessive time lapse between successive sweeps of the energy beam through a particular region of interest. In some situations a reduction of scan angle, permitting higher back-and-forth scan frequency is a solution. In other circumstances, however, a wide sector angle may be necessary, in which case a slower scan frequency is ordinarily required, since the angular scan rate (i. e. degrees per unit of time) ordinarily may not be increased above certain values, related to range setting (i. e. pulse repetition rate), without risking incomplete coverage of the sector.

The present invention also concerns itself with minimizing the foregoing problem experienced with wide-angle sector scan, a result which is accomplished herein by mechanically coordinating the respective adjustments of angular scan rate and operating range, so that the two are inversely related in an optimum ratio. In this way the operator of a sonar device is relieved of the task of attempting to correlate with uncertain accuracy angular scan rate and pulse repetition rate by separate adjustments of these variables so as to achieve maximum angular scan rate without risking loss of signals due to an excessively high rate. In the particular sonar device hereinafter described by way of example, three different scan angles and three different range settings are provided. The range settings are 400, 800 and 1600 feet, respectively. In the first described embodiment the maximum scan angle obtainable is 180 degrees, and this is regarded as a relatively wide sector angle in terms of the problem mentioned just above. In this scan angle setting of the device the feature of mechanical coordination between operating range and angular scan rate adjustments becomes automatically operative for all range settings. The illustrative device also provides for an intermediate scan angle of 90 degrees, but in this setting the above-described problem of time lapse between successive scans is regarded as serious only at maximum range settings. Accordingly, angular scan rate is coordinated with range only when changing between the maximum and intermediate range settings. It is held constant at a predetermined value when changing between the intermediate and minimum range settings; whereas it is also held constant at a different value for all three range settings when the scan angle is set at the minimum value, namely 45 degrees. The advantage of holding scan angle constant at predetermined values under this latter condition lies in the fact that the sector scan control apparatus of this first described embodiment is thereby simplified and is not complicated unnecessarily by the described type of mechanical coordinating means, whereas the advantages of incorporating such means for the wide sector angle setting, for instance, far outweigh the disadvantages of apparatus complexity.

In the second described embodiment sector scan rate is automatically varied with all changes in range setting so as to provide an angular scan rate which is at all times directly proportional to system pulse repetition rate. This result is achieved according to a further feature of the invention by means of a bridge circuit comprising the respective windings of the servo follow-up potentiometer and the drive control potentiometer connected in shunt to each other through resistance elements which may be selected as to size by switch means mechanically coordinated with separate switch means operable to selectively vary sonar pulse repetition rate. In addition such resistance elements are preferably variable, whereby scan sector orientation may be varied at will.

These and other features, objects and advantages of the invention including certain details of the preferred form thereof will become more fully evident from the following description by reference to the accompanying drawings.

Figure 1:
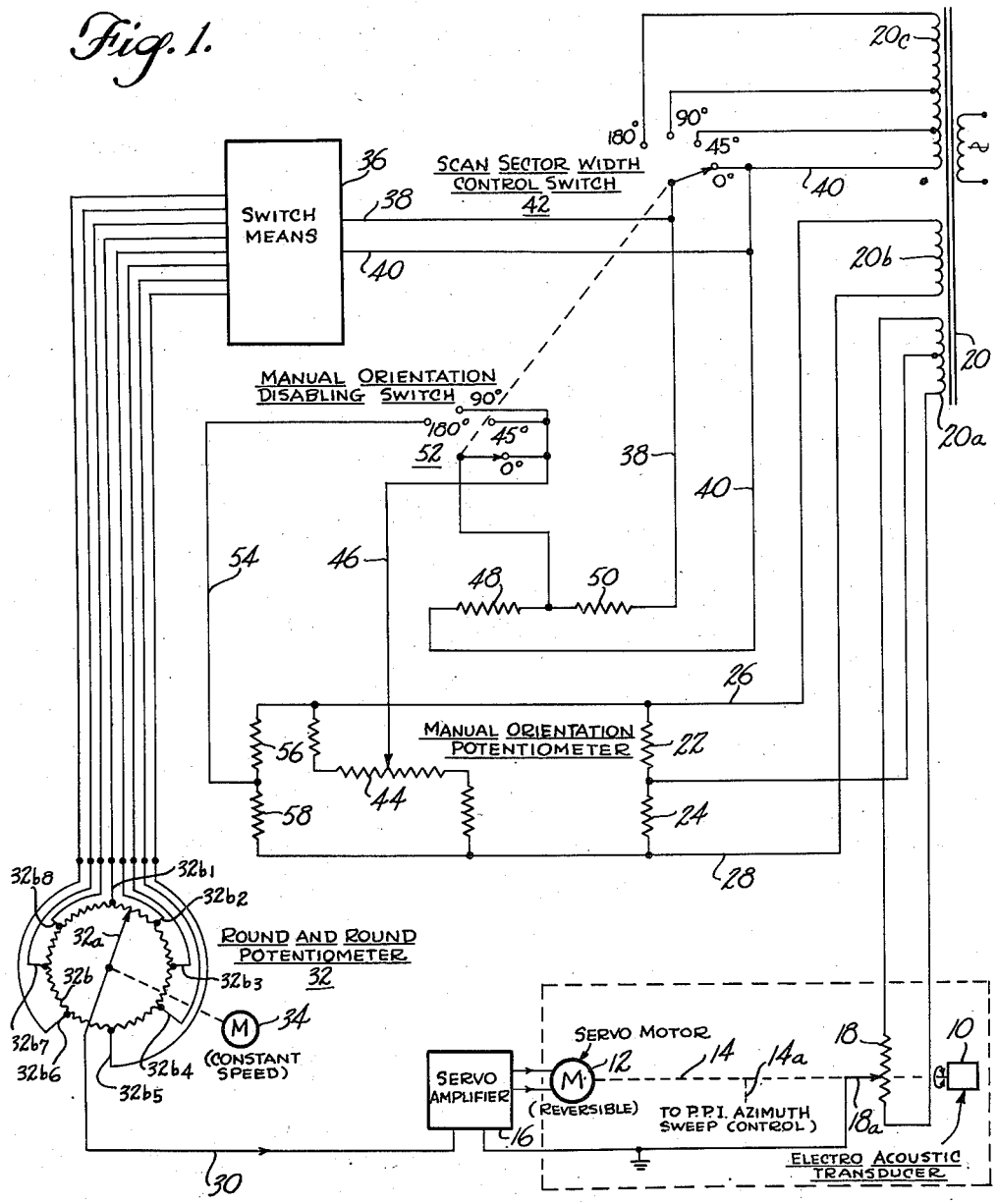
Figure 1 is a simplified schematic diagram of the first mentioned embodiment of the improved sector scan control circuit in a basic form.

Referring to Figure 1, the sonar transducer 10 is mechanically scanned by the reversible servomotor 12 and drive shaft 14. A connection 14a from this shaft may be provided to operate the azimuth sweep controls of a conventional P. P. I. cathode ray indicator (not shown) or other indicator device. The motor 12 is controlled in accordance with voltages developed in a normally balanced bridge circuit to be described, such voltages being applied to servoamplifier 16 energizing the motor. One leg of the normally balanced bridge circuit incorporates a follow-up potentiometer 18 having its wiper 18a mechanically driven by the servomotor 12 in a sense to restore balance in the bridge circuit, that is to reduce the input voltage of amplifier 16 to zero. The winding terminals of this potentiometer are connected to the secondary 20a of the power transformer 20. This secondary winding has a mid-tap connected to the mid-point of a voltage divider comprising the equal resistors 22 and 24 connected in series between bridge circuit conductors 26 and 28 energized by the secondary 20b of the transformer 20. Potentiometer wiper 18a is electrically grounded; hence movement of this wiper has the effect of varying the voltages of conductors 26 and 28 equally and oppositely with respect to ground.

Incorporated in the opposite end of the bridge circuit being referred to is a continuous 360-degree-wound potentiometer 32, designated the "round and round" potentiometer. The wiper arm 32a of this potentiometer is mechanically rotated by the constant-speed motor 34 and is connected electrically to the servo amplifier input conductor 30. As will later appear the amplitude-modulated voltages developed by this rotating wiper are applied to the servoamplifier input in bucking relation to the follow-up potentiometer voltages and the result is a reciprocating motion of the follow-up wiper 18a effected by servomotor energization.

Potentiometer winding 32b has a plurality of pairs of energizing taps arranged at uniform intervals about its circumference, there being eight such taps in the example located at 45-degree spacings. These taps are designated consecutively 32b1, 32b2 . . . 32b8. The circuit further includes switch means 36 by which the voltage between bridge circuit conductors 38 and 40 may be applied to selected numbers of pairs of round and round potentiometer taps with alternately opposite polarity of the taps so energized. As later described by reference to Figure 2, the switch means 36 provides three settings in the present example. In one of these the voltage between conductors 38 and 40 is applied only to the opposing taps 32b1 and 32b5. In a second setting of said switch means such voltage is applied to these taps and the pair 32b3 and 32b7, whereas in the third setting it is applied to all eight of the taps. In the first case tap 32b1 is connected to conductor 38, for instance, and tap 32b5 to conductor 40. In the second case taps 32b1 and 32b5 are both connected to conductor 38 while taps 32b3 and 32b7 are connected to conductor 40. In the third instance taps 32b1 and 32b3, 32b5 and 32b7 are connected to conductor 38 while the four remaining taps are connected to conductor 40. The effect of changing from the first to the second settings of switch means 36 is to double to triangular wave modulation frequency of the alternating voltage of wiper 32a, whereas the effect of changing from the second to the third setting is to redouble this frequency. The sector scan frequency of transducer 10 is thus controlled by switch means 36.

In order to vary the amplitude of the voltage applied to the round and round potentiometer taps, hence the sector scan angle, transformer 20 has a third winding 20c with spaced taps. One end of this winding is connected to conductor 40 while the opposite end and selected intermediate voltage points or taps on the winding are connected to respectively different contacts of a sector scan width control switch 42, the arm of which is connected to conductor 38. In the example the switch 42 has four contacts. The two intermediate contacts are connected respectively to the half-voltage and quarter-voltage points of winding 20c. In the initial position of the switch 42 zero voltage is applied between conductors 38 and 40, and as will later appear this produces a sector scan angle of zero, whereas in the successively advanced settings of the switch respectively applying one-fourth, one-half and full voltage of the transformer secondary 20c to the opposite polarity taps of round and round potentiometer 32, sector scan angles of 45, 90 and 180 degrees, respectively, are produced.

The complete bridge circuit controlling energization of the servo amplifier 16 further comprises a manual orientation potentiometer 44 connected between the conductors 26 and 28. The wiper of this potentiometer is connected by way of conductor 46 to the mid-point of a voltage divider comprising equal resistors 48 and 50 connected across conductors 38 and 40. A four-position switch 52, mechanically coordinated with the sector width control switch 42, applies the voltage of cnoductor 46 to the midpoint of the voltage divider 48, 50 in the three positions of the switches representing zero scan angle (i. e., fixed transducer), 45-degree sector width and 90-degree sector width, whereas in the fourth position of the switch corresponding to the 180-degree sector width the mid-point of voltage divider 48, 50 is connected by way of conductor 54 to the mid-point of another voltage divider comprising the equal resistances 56 and 58 connected in series between conductors 26 and 28. In this latter position of switches 42 and 52 the manual orientation potentiometer 44 is therefore disconnected from the control bridge circuit comprising voltage divider 48, 50; hence the 180-degree sector scan setting of the system is always fixed with respect to the heading of the vessel.

Only the apparatus enclosed by the dotted rectangle in Figure 1 need be mounted at or in physical association with the transducer in the bottom of the vessel. The remaining apparatus may be mounted in any desired location.

In the operation of the basic circuit arrangement illustrated in Figure 1, the round and round potentiometer wiper 32a is rotated continuously at constant speed in all sector width settings of switches 42 and 52, preferably including the zero width or fixed transducer setting thereof. If the follow-up potentiometer were not moved by the servomotor 12 to reduce the positional error voltage in the servo "loop," the conductor 30 would carry alternating voltage of alternately increasing and decreasing amplitude, with the phase of such alternating voltage reversing every half cycle of the modulation envelope. The amplitude of this triangular wave modulation envelope, that is the maximum alternating voltage amplitude applied to the servo amplifier input under the assumed condition of a fixed follow-up potentiometer wiper would be either zero, one-fourth, one-half or the full voltage of transformer secondary 20c, depending upon the setting of switches 42 and 52. The frequency of this triangular wave modulation envelope is determined by the number of pairs of round and round potentiometer taps selected for energization by switch means 36. If but two of these taps, such as 32b1 and 32b5, are selected the triangular modulation wave frequency will be equal to the rotational frequency of wiper 32a, whereas this modulation wave frequency may be doubled by selecting four taps and redoubled by selecting eight taps for energization as previously described. In effect, therefore, the round and round potentiometer 32, switch means 36, switch 42, and transformer secondary 20c comprise a generator of alternating voltage amplitude modulated by a triangular wave of variable frequency and amplitude, and with phase reversals of the alternating voltage every half cycle of the modulation wave.

By applying this amplitude-modulated alternating voltage to the input of servo amplifier 16, servomotor 12, hence transducer 10, is caused to rotate first in one direction and then the other, suitable circuit arrangements of a conventional nature being made in the amplifier by which the direction of motor rotation is controlled by alternating voltage phase relationship to a reference alternating voltage applied by means not shown. The actual speed and limits of transducer scan movement produced by servomotor 12 are partly dependent on the amplitude of alternating voltage applied to the follow-up potentiometer 18 by transformer secondary 20a. The voltage to ground of follow-up wiper 18a is added algebraically to the potentials of conductors 38 and 40 and bucks or tends to neutralize the voltage to ground otherwise derived by round and round potentiometer wiper 32a. Thus as the amplitude of the voltage to ground of conductor 30 tends to vary with rotation of the round and round potentiometer the servomotor is thereby energized to move follow-up wiper 18a in a sense and at a rate preventing such voltage from becoming large. This positional error voltage may be kept very small with a high-gain servo-amplifier and a sensitively responsive servomotor.

In effect, therefore, the instantaneous rotated position of the follow-up wiper 18a, hence of the transducer 10, is continuously representative of the instantaneous value of the triangular modulation wave being generated by the round and round potentiometer. The limits of sector scan thus produced are therefore established by the amplitude of alternating voltage applied to the round and round potentiometer winding taps. In the example the three applied voltages (besides zero) respectively produce 45-degree, 90-degree and 180-degree sector scan movements of the transducer.

In the 180-degree scan angle setting of switches 42 and 52 the potentials of conductors 38 and 40 are equally above and below ground potential, since conductor 54 is at the same potential as the mid-tap of transformer secondary 20a and the latter is always at the potential of follow-up wiper 18a, which is grounded as shown. As a result the orientation of the 180-degree sector scan angle is fixed, preferably with its bisector aligned with the vessel heading. However, in the other three positions of these switches the manual orientation potentiometer 44 provides a means of adding a variable alternating voltage to that produced by the follow-up potentiometer, such variable voltage being reversible as to phase, relative to the voltage between conductors 38 and 40. In the 45-degree and 90-degree settings of switches 42 and 52 the setting of potentiometer 44 thereby establishes the mean position of follow-up wiper 18a, hence of the transducer 10. In the zero position of these coordinated switches potentiometer 44 becomes a means of training the transducer entirely by manual control and without automatic sector scan. In either case the mid-position of the wiper of potentiometer 44 represents the dead-ahead position of the transducer. The transducer may be rotated either to port or starboard by advancing this wiper in one direction or the other out of its mid-position.

Figure 2:
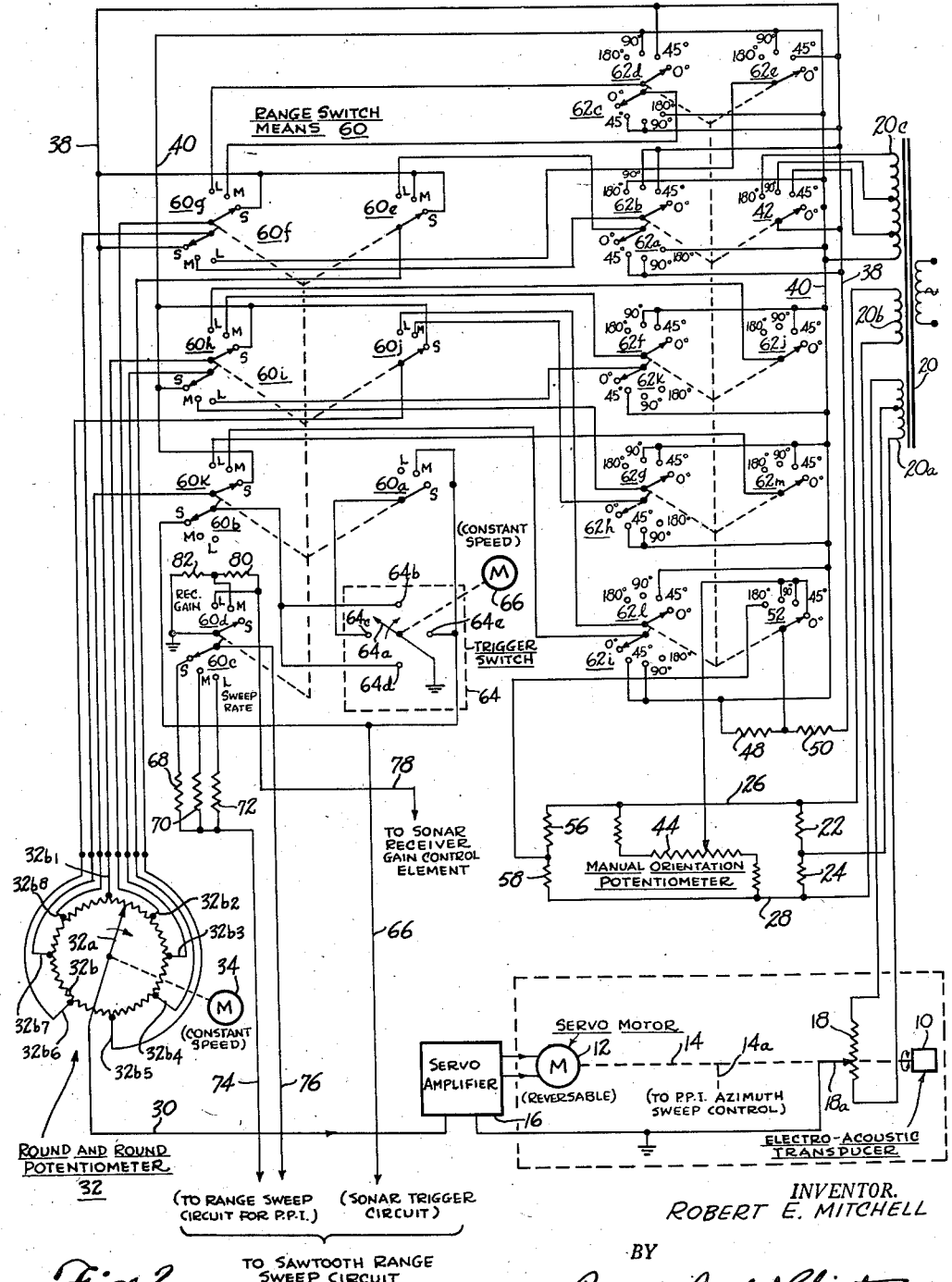
Figure 2 is a complete schematic diagram of a coordinated sonar system incorporating the sector scan control circuit shown in Figure 1, including switch means providing the described coordination between range setting and sector scan rate.

In Figure 2 means are provided mechanically coordinating the range settings and sector scan settings in a sonar system embodying the invention. In general it will be noted that two ganged switch groups are employed, one the range switch means 60 (which has no direct counterpart in Figure 1) and the sector angle switch means 62 likewise having no direct counterpart in Figure 1 because of the feature of mechanical coordination to be described. As will become clear, the manual settings of these two groups of ganged switches determine not only the sector scan width and operating range of the system but also the sector scan rate or period. Parts corresponding to like numbered parts in Figure 1 will not be described again.

The range switch means 60 has three available settings represented by the contacts labeled S, M and L, corresponding respectively to short, medium and long-range operation of the sonar device. A motor-driven trigger switch 64 driven at constant speed by a motor 66 provides the timing of transmitted pulses in the sonar device by periodically grounding the conductor 66 leading to the sonar trigger circuit (not shown). The rotary arm 64a of the trigger switch is grounded and comes into contact successively with four equally-spaced stationary contacts 64b, 64c, 64d and 64e. Trigger contact 64c is connected to the arm of range switch unit 60a, and contacts 64b and 64d to the arm of range switch unit 60b. Contact 64e is connected directly to conductor 66 and also to the S and M contacts of range switch unit 60a. Because of these range switch unit connections, the trigger switch arm 64a grounds the conductor 66 once every revolution when the range switch units are in the L or long-range position, twice every revolution when in the intermediate or M position and four times every revolution when in the S position. Accordingly the "L" setting of the range switch 60 produces a sonar operating range (i. e. pulse to pulse intervals) twice that of the "M" setting, and the latter in turn produces an operating range twice that of the "S" position of this switch.

The illustrative sonar device may incorporate a cathode ray indicator (not shown) of the PPI type, including a sawtooth sweep circuit for deflecting the cathode ray tube beam at a linear rate for range indication purposes, and azimuth deflection means controlled by the shaft take-off 14a in conventional or suitable manner, the details of which are not here important. The periodic range sweep of the cathode ray tube beam is initiated simultaneously with each transmitted pulse by synchronously triggering the indicator range sweep circuit with the system transmitter under control of the motor-driven switch 64. In order to utilize the full cathode ray tube screen area for display purposes at each of the three range settings the slope or pitch of the sawtooth range sweep voltages must be varied inversely with pulse repetition rate. For this purpose a switch unit 60c of the range switch means 60 is provided having its three stationary contacts S, M and L connected respectively to successively different size resistors 68, 70 and 72 determining sawtooth wave generator time constant.

The conductor 78 leading to the receiver gain control element (not shown) is connected to the contact L of switch unit 60d and to one side of the voltage divider comprising series-connected resistors 80 and 82. The opposite side of this voltage divider is grounded. The M contact of this switch unit is connected to the junction between resistors 80 and 82 whereas the S contact thereof is connected directly to the conductor 78. The arm of the switch is grounded. By shifting the position of the switch 60d from the S to the M position and then to the L position corresponding to progressively greater operating range in the sonar device the receiver gain is increased by appropriate amounts due to the increase of resistance inserted between conductor 78 and ground. It is found that such a variation of receiver gain with range setting in a sonar device provides an improvement in the discernability of reflecting objects in the field of search. Additional refinements such as cyclic automatic gain control may also be employed to advantage in such a system.

The electrical connections between the several taps of the round and round potentiometer winding, the terminals of the range switch 60 and the terminals of the scan angle switch 62 are such that in the maximum scan angle (180-degree) setting of the latter, a change in the sonar operating range effected by a repositioning of range switch 60 produces an inversely proportional change in the angular scan rate or sector scan frequency. Assuming the constant speed motor 34 to be turning at a rate of one revolution in forty-five seconds, positioning of the range switch 60 in the L position wherein potentiometer taps 32b1 and 32b5 alone are energized results in a sector scan period of forty-five seconds, representing the time required for the transducer to be moved back and forth through one complete scan cycle. The energizing potential for tap 32b1 is applied by a direct connection from conductor 38, and that for tap 32b5 by a connection from conductor 40 formed through the L contact of range switch unit 60e and the 180-degree contact of sector angle switch unit 62a.

With the scan angle switch means 62 remaining in the 180-degree sector angle position, shifting of the range switch 60 from the L to the M position results in halving the sector scan period, that is, in a reduction from 45 seconds to 22.5 seconds. Under these conditions potentiometer taps 32b1 and 32b5 are energized by the same potential, representing that of energized conductor 38, whereas the intermediate taps 32b3 and 32b7, displaced 90 degrees from the first-mentioned pair of taps in terms of wiper rotation, are energized by the opposite potential of energized conductor 40. The tap 32b5 is connected to conductor 38 through the M contact of range switch unit 60e. The tap 32b7 is connected to conductor 40 through the M contact of range switch unit 60f, and the 180-degree contact of sector angle switch unit 62b. The tap 32b3 is connected to conductor 40 through the M contact of range switch unit 60g and the 180-degree sector contact of sector angle switch unit 62c. Thus one complete revolution of the round and round potentiometer wiper 32a produces two complete cycles of the triangular wave amplitude variations and four phase reversals of the alternating voltage derived by this wiper for application to conductor 30. This results in two complete sector scan cycles of the transducer 10 for one rotation of wiper 32a.

With the sector angle switch means 62 remaining in the 180-degree sector position, shifting of the range switch means from the M position to the S position, that is to the minimum range setting of the sonar device, results in a re-halving of the sector scan period, that is, in a reduction thereof from 22.5 seconds to 11.25 seconds. This is the result of connecting the round and round potentiometer taps 32b1, 32b3, 32b5 and 32b7 to the energized conductor 38, and the intermediate taps 32b2, 32b4, 32b6 and 32b8 to the oppositely energized conductor 40. Under these conditions tap 32b3 is connected to conductor 38 through the S contact of range switch unit 60g, tap 32b5 is connected to conductor 38 through the S contact of range switch unit 60e, and tap 32b7 is connected to conductor 38 through the S contact of range switch 60f. At the same time, tap 32b2 is connected to energized conductor 40 through the S contact of range switch unit 60h, tap 32b4 is connected to conductor 40 through the S contact of range switch unit 60i, tap 32b6 is connected to conductor 40 through the S contact of range switch unit 60j, and tap 32b8 is connected to conductor 40 through the S contact of range switch unit 60k. Hence, one complete revolution of the round and round potentiometer wiper 32a results in four complete triangular wave modulation cycles and eight phase reversals of the alternating voltage applied by the wiper 32a to the conductor 30 and four complete sector scan cycles of the transducer 10.

By shifting the sector angle switch means 62 from the 180-degree sector position to the 90-degree sector position, manipulation of the range switch means 60 between its various positions has a different effect on sector scan period and angular scanning rate. In the L position of the range switch 60 two complete sector scan cycles per revolution of the round and round potentiometer wiper 32a are produced, whereas in both the M and S positions of the range switch four complete sector scan cycles of the transducer are produced per revolution of the round and round potentiometer wiper. In the L position of the range switch the sector scan period is 22.5 seconds under the assumed conditions stated above, whereas in the M and S positions the sector scan period is 11.25 seconds.

With the scan angle switch 62 set in the 90-degree sector position, and the range switch 60 set in the L position, potentiometer taps 32b1 and 32b5 are connected to the energized conductor 38 while the intermediate taps 32b3 and 32b7 are connected to the oppositely energized conductor 40. Tap 32b5 is connected to conductor 38 through the L contact of range switch 60e and the 90-degree sector contact of sector angle switch unit 62a. Tap 32b3 is connected to conductor 40 through the L contact of range switch unit 60g and the 90-degree sector contact of sector angle switch unit 62d, while tap 32b7 is connected to conductor 40 through the L contact of range switch unit 60f and the 90-degree sector contact of scan angle switch unit 62e.

In the M position of range switch unit 60, with the sector angle switch maintained in its 90-degree sector angle setting, the potential of conductor 38 is applied to taps 32b1, 32b3, 32b5 and 32b7, whereas that of the potential of conductor 40 is applied to the intermediate set of four taps. Under these conditions conductor 38 is connected to tap 32b3 through the M contact of range switch unit 60g and the 90-degree sector contact of scan angle switch unit 62c, to tap 32b5 through the M contact of range switch unit 60e, and to tap 32b7 through the M contact of range switch unit 60f and the 90-degree sector contact of sector angle switch unit 62b. Conductor 40 is connected to tap 32b2 through the M contact of range switch unit 60h and the 90-degree sector contact of sector angle switch unit 62f, to tap 32b4 through the M contact of range switch unit 60i, and the 90-degree sector contact of sector angle switch unit 62g, to tap 32b6 through the M contact of range switch unit 60j and the 90-degree sector contact of sector angle switch unit 62h, and to tap 32b8 through the M contact of range switch unit 60k and the 90-degree sector contact of sector angle switch unit 62i.

With the scan angle switch 62 remaining in the 90-degree sector position, the effect of switching the range switch 60 to the S position, representing the minimum range setting of the sonar device, is to preserve the same 11.25 second scan period as with the M or medium range setting of the range switch, although some of the connections applying potential to the round and round potentiometer taps differ. Thus the potential of conductor 38 is applied directly to tap 32b1, while being applied to tap 32b3 through the S contact of range switch unit 60g, to tap 32b5 through the S contact of range switch unit 60e, and to tap 32b7 through the S contact of range switch unit 60f. On the other hand, the potential of conductor 40 is applied to tap 32b2 through the S contact of range switch unit 60h, to tap 32b4 through the S contact of range switch unit 60i, to tap 32b6 through the S contact of range switch unit 60j, and to tap 32b8 through the S contact of range switch unit 60k.

In the 45-degree sector position of the sector angle switch 62 the scan period is the same (11.25 seconds) for all settings of switch 60. In the S position of range switch 60 conductor 38 is connected to round and round potentiometer tap 32b3 through the S contact of range switch unit 60g, to tap 32b5 through contact S of range switch unit 60e, and to tap 32b7 through contact S of range switch unit 60f. Conductor 40 is connected to potentiometer tap 32b2 through contact S of range switch unit 60h, to tap 32b4 through contact S of range switch unit 60i, to tap 32b6 through contact S of range switch unit 60j, and to tap 32b8 through contact S of range switch unit 60k.

With switch 62 remaining in the 45-degree setting, in the M or intermediate range setting of range switch 60 conductor 38 is connected to potentiometer tap 32b3 through the M contact of range switch unit 60g and the 45-degree sector contact of sector angle switch unit 62c, to tap 32b5 through the M contact of range switch unit 60e, and to tap 32b7 through the M contact of range switch unit 60f and the 45-degree sector contact of switch unit 62b. The potential of conductor 40 is applied to tap 32b2 through the M contact of range switch unit 60h and the 45-degree sector contact of sector angle switch unit 60f, to tap 32b4 through the M contact of range switch unit 60i and the 45-degree sector contact of sector ange switch unit 60g, to tap 32b6 through the M contact of range switch unit 60j and the 45-degree sector contact of scan angle switch unit 62h, and to tap 32b8 through the M contact of range switch unit 60k and the 45-degree sector contact of sector angle switch unit 62i.

With switch 62 remaining in the 45-degree setting, in the L position of the range switch 60 the potential of conductor 38 is applied to potentiometer tap 32b3 through the L contact of range switch unit 60g and the 45-degree sector contact of angle switch unit 62d, to the tap 32b5 through the L contact of range switch unit 60e and the 45-degree sector contact of sector angle switch unit 62a, and to tap 32b7 through the L contact of range switch unit 60f and the 45-degree sector contact of sector angle switch unit 62e. The potential of conductor 40 is applied to tap 32b2 through the L contact of range switch unit 60h and the 45-degree sector contact of sector angle switch unit 62j, to tap 32b4 through the L contact of range switch unit 60i and the 45-degree sector contact of sector angle switch unit 62k, to tap 32b6 through the L contact of range switch unit 60j and the 45-degree sector contact of sector angle switch unit 62l, and to the tap 32b8 through the L contact of range switch unit 60k and the 45-degree sector contact of the sector angle switch unit 62m.

The following table of values summarizes the available settings of the sector scan control circuit shown in Figure 2 under the numerical assumptions set forth hereinabove by way of example:

Table of operating ranges and sector scan angles and periods obtainable with sonar device incorporating control circuit of Figure 2

| Range (Controlled by switch 60) | Sector Scan Angle (Controlled by switch 62) | Sector Scan Cycle Period (Result of Combined Settings of Switches 60 and 62) |
|---|---|---|
| | Degrees | Seconds |
| 400 feet (S) | 180 | 11.25 |
| | 90 | 11.25 |
| | 45 | 11.25 |
| | 0 | 0. |
| 800 feet (M) | 180 | 22.5 |
| | 90 | 11.25 |
| | 45 | 11.25 |
| | 0 | 0. |
| 1,600 feet (L) | 180 | 45. |
| | 90 | 22.5 |
| | 45 | 11.25 |
| | 0 | 0. |

It will be observed from the above table that in the 180-degree sector angle position of switch 62, the sector scan period is varied inversely with operating range, and that the same is true in the 90-degree setting of switch 62, but in the latter instance only when changing between the two range settings L and M. When changing between the M and S range settings of switch 60, in the 90-degree setting of switch 62, no change in sector scan period occurs. Likewise in the 45-degree setting of switch 62 no change in sector scan period occurs when operating range is varied. Such a control arrangement thereby provides an optimum relationship between range and angular scanning rate when maximum permissible scanning rate is important, while sparing circuit complexity required for coordination between range and sector scan controls under conditions not requiring such coordination.

In the zero sector width setting of the sector angle switch 62 all taps of the round and round potentiometer are at the same potential, which is that applied by the manual orientation potentiometer 44 through the zero sector contact of sector angle switch unit 52, the voltage divider resistors 48 and 50, and the conductors 38 and 40 shorted together by the sector angle switch unit 42 in its zero sector angle position as illustrated in the figure. By adjustment of the manual orientation potentiometer wiper, the amplitude and phase of alternating voltage applied to conductor 30 may be varied, thereby producing follow-up movement of the wiper of follow-up potentiometer 18, hence of transducer 10. As previously explained, the mean position of the transducer and of the follow-up potentiometer wiper in the 45- and 90-degree sector scan settings of sector angle switch unit 52 may also be varied by adjustment of the manual orientation potentiometer. However, in the 180-degree sector position of sector angle switch unit 52 the manual orientation potentiometer is disconnected from the round and round potentiometer taps and replaced by a connection to the mid-point of the voltage divider comprising resistors 56 and 58.

Figure 3:
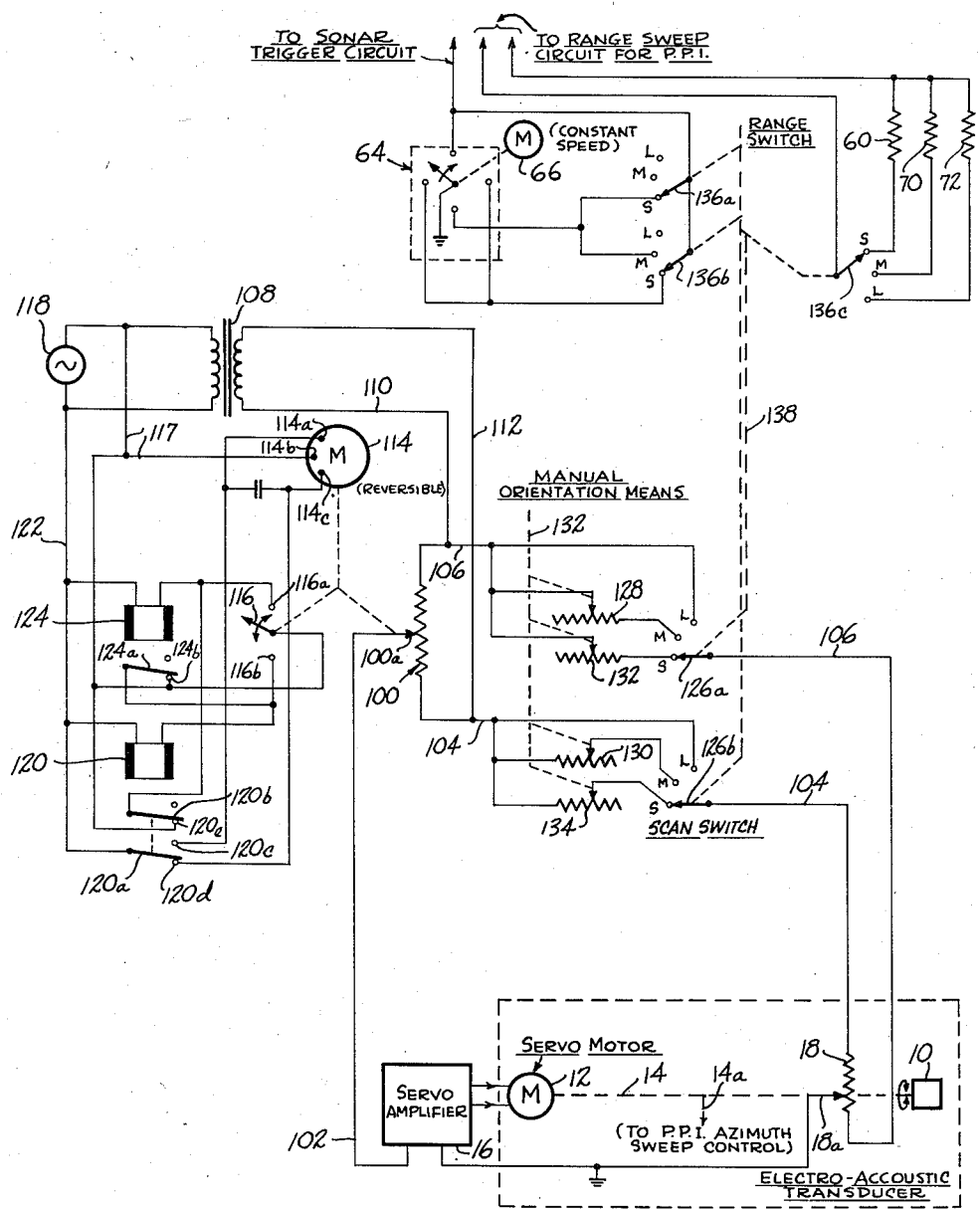
Figure 3 is a schematic diagram of a modified coordinated sonar system and sector scan control circuit.

In the modified embodiment shown in Figure 3, as mentioned above, the round and round potentiometer is replaced in effect by the continuously reciprocated drive control potentiometer 100 for generating the triangular wave scan-producing voltage variations in the scan servo bridge circuit. Also the modified system shown in Figure 3 incorporates means for coordinating sonar pulse repetition rate with angular scan rate for all available adjustments of either.

The slider or wiper 100a of potentiometer 100 is connected by a conductor 102 to an input terminal of servo amplifier 16. As in the previously described example, the opposing input terminal of this amplifier is connected to the wiper 18a of follow-up potentiometer 18. Corresponding ends of the potentiometer windings 100 and 18 are interconnected by conductors 104 and 106, respectively, containing scan selector switch means and associated resistance elements to be described, forming the servo bridge circuit. Energizing voltage is applied to this bridge circuit directly across potentiometer winding 100 by means of the transformer 108 and the conductors 110 and 112. Thus any change in the positioning of potentiometer wiper 100a unbalances the servo bridge circuit, energizes the servo amplifier and produces a corresponding change in the positioning of potentiometer wiper 18a and transducer 10 mechanically connected therewith.

In order to produce back and forth (sector) scan of transducer 10, potentiometer wiper 100a is reciprocated continuously back and forth by the reversible A. C. motor 114 and suitable speed reduction means (not shown). The limits of such reciprocation are established by the stationary contacts 116a and 116b of motor-operated switch 116. Motor 114 is of the type having three input terminals comprising the common terminal 114b connected by conductor 117 directly to one side of an alternating voltage source 118, and the terminals 114a and 114c connected alternately by relay 120 to the opposite side of said source through conductor 122. Relay 120 has two switch arms 120a and 120b. Arm 120a, connected to conductor 122, has alternately engaged contacts 120c and 120d connected to their respective motor terminals 114a and 114c. Arm 120b, connected to switch contact 116a, has a contact 120e engagement of which produces energization of the winding of a second relay 124 when the relay 120 is unenergized. Energization of relay 124 causes its single switch arm 124a, connected to switch contact 116b, to open the normal energizing circuit of relay 120 by disengagement of such arm from its contact 124b. Likewise, energization of relay 120 causes its switch arm 120b to open the normal energizing circuit of relay 124. The limit switch arm 116 is connected to motor terminal 114b.

Since the construction and operation of the above-described reversing circuit for motor 114 are of secondary importance herein, further details are deemed unnecessary. Briefly, it will be apparent that engagement of limit position contact 116a by switch arm 116 energizes relay 124 temporarily, which opens the normal energizing circuit for relay 120 and causes application of reverse-drive voltage to motor terminal 114a. Contact 116a is thereupon disengaged; however, relay 124 is not thereby deenergized, as a holding circuit therefor is formed through relay switch 120b. Similarly, after the motor 114 has driven potentiometer wiper 100a in the reverse direction to its opposite limit, engagement of contact 116b temporarily energizes relay 120, thereby breaking the holding circuit for relay 124 and applying motor reversing voltage to the motor terminal 114c, so that the motor again reverses itself. Contact 116b is thereupon disengaged. However, relay 124 remains deenergized and forms a holding circuit for relay 120, so that rotation of motor 114 in the new sense continues to the opposite limit, as desired. Thus potentiometer wiper 100a is continuously reciprocated by a motor 114 between fixed positional limits at a rate determined by the speed-torque characteristic of the motor. In a typical case about ten seconds are required for the wiper 100a to be moved from one positional limit to the other.

The back and forth angular scan of transducer 10 produced by such continuous reciprocation of potentiometer wiper 100a occurs at an angular rate determined in the example by the ratio of the resistance of potentiometer winding 100 and the total resistance in the side of the bridge circuit comprising the potentiometer winding 18, and, of course, also by the rate of movement of potentiometer wiper 100a. In the "L" position, that is the long-range setting, of scan switch units 126a and 126b the ends of potentiometer winding 18 are connected directly to the ends of potentiometer 100. Thus, for example, if the potentiometer windings 18 and 100 happen to be identical, the wiper 18a would be moved at the same angular rate and between the same angular limits as the wiper 100a. In the "M" position, that is the medium-range position, of scan switch units 126a and 126b variable resistances 128 and 130 are interposed respectively in the conductors 106 and 104. The wipers of these variable resistances are mechanically interconnected by the means 132 so that an increase in the resistance value of one is accompanied by an equal decrease in the resistance value of the other, and vice versa. In any setting of the mechanical adjustment 132 (manual orientation means) the sum of these two variable resistances then interposed in the conductors 104 and 106 when added to the resistance of potentiometer winding 18, causes the angular scan rate of wiper 18a, hence of transducer 10, to be higher than that of potentiometer wiper 100a than in the "L" position of the scan switch. Thus in a typical case if the pulse repetition rate of the sonar device is doubled in adjusting its operation from the long-range setting to the medium-range setting, then it would be desirable in accordance with the invention for the angular scan rate to be doubled. Accordingly, in that instance the sum of the resistances presented by variable resistors 128 and 130 would be equal to the resistance of potentiometer winding 18.

Similarly, in the "S" position or short-range setting of scan switch units 126a and 126b variable resistances 132 and 134 are respectively interposed in series with the conductors 106 and 104. The wipers of these resistances are likewise mechanically interconnected by the manual orientation means 132 in relatively reverse manner so that the resistance of one is increased as the resistance of the other is decreased, and vice versa. Assuming the sonar pulse repetition rate is redoubled in shifting from the medium- to the short-range settings, then the sum of the resistances presented by variable resistors 132 and 134 should be three times the resistance of potentiometer winding 18.

As in the previously described form of the invention, the pulse repetition rate, hence the operating range, of the sonar device is determined by a range switch having mechanically interconnected units 136a, 136b and 136c. In the example each of these has three settings corresponding to the long, medium and short ranges of operation. The setting of the units 136a and 136b determines the frequency with which the sonar trigger circuit is momentarily grounded by the motor-driven switch 64, as in the previous case. The setting of the range switch unit 136c determines which of the different size resistances 60, 70 or 72 are incorporated in the range sweep circuit for the plan position indicator of the sonar device, so that the sweep rate of the electron beam in the cathode ray indicator will correspond to operating range in the system according to well known considerations.

In accordance with the present invention the range switch and the scan switch are mechanically coordinated by a means 138 so that angular scan rate of transducer 10 is increased and decreased with pulse repetition rate of the sonar transmitter. A manually effected change in the setting of either of these switches therefore produces a corresponding change in the setting of the other, so that an optimum relationship is maintained, producing fast search coverage of the particular sector being scanned.

In the example shown in Figure 3 it will be apparent that there is an incidental increase of scan angle accompanying an increase of scan rate. This is due to the fact that the potentiometer wiper 100a reciprocates continuously at the same rate and between the same positional limits in all settings of the range and scan switches. Thus if in the example the scan rate is doubled, the scan angle will likewise be doubled, and this would take place accompanying a doubling of the pulse repetition rate.

The purpose of the manual orientation means by which the variable resistances 128, 130 and 132, 134 are varied is to permit varying the orientation of the scan sector relative to the heading of the vessel or to a fixed orientation line. It will be apparent that in any given setting of the scan switch the neutral point or average position of the reciprocated potentiometer wiper 18a may be moved toward one end or the other of winding 18 by varying the ratio of the values of resistance interposed in the conductors 104 and 106, respectively. Such variation is accomplished without changing the sum of the resistances represented by the winding 18 and the variable resistances connected across the potentiometer winding 100a, due to the reverse mechanical connections between the pairs of variable resistances 128, 130 and 132, 134 represented in the manual orientation mechanical means 132.

It will be apparent that numerous changes and modifications may be made in the illustrative apparatus without departing from the characterizing features involved comprising the present invention. For instance it is obvious that the control circuits may be operated by direct current instead of alternating current. In that event the round and round potentiometer (or the control potentiometer in the system of Figure 3) would effectively generate an alternating direct voltage wave of triangular wave form, as the equivalent of the similarly generated triangular modulation wave envelope produced by the illustrated apparatus. There would be no essential distinction between these two results, and reference to either in the appended claims is intended to embrace both, since the servomechanism circuits for producing reciprocating motion from either form of such triangular alternating voltage wave are generally similar. The invention is not necessarily limited, therefore, by the details of illustration herein.

I claim as my invention:

1. In combination with a propagative wave energy system including a directionally sensitive wave energy transducer, apparatus for angularly scanning said transducer back and forth comprising scan servo means drivingly connected to said transducer, a normally balanced bridge circuit including follow-up means energizingly connected to said servo means and mechanically driven by said servo means in a sense to restore circuit balance, and scan control means applying progressive unbalance alternating voltages to said bridge circuit of triangular wave form including means manually adjustable to vary the amplitude and period of said unbalance voltages, and means manually adjustable for balancing said bridge circuit in various different positions of said transducer and follow-up means.

2. In combination with a propagative wave energy system including a directionally sensitive wave energy transducer, apparatus for angularly scanning said transducer back and forth comprising scan servo means drivingly connected to said transducer, a normally balanced bridge circuit including follow-up means energizingly connected to said servo means and mechanically driven by said servo means in a sense to restore circuit balance, and scan control means applying progressive unbalance alternating voltages to said bridge circuit of triangular wave form including means manually adjustable to vary the amplitude and period of said unbalance voltages.

3. In combination with a propagative wave energy system including a directionally sensitive wave energy transducer, apparatus for angularly scanning said transducer back and forth comprising scan servo means drivingly connected to said transducer, a normally balanced bridge circuit including follow-up means energizingly connected to said servo means and mechanically driven by said servo means in a sense to restore circuit balance, and scan control means applying progressive unbalance alternating voltage to said bridge circuit of triangular wave form including means manually adjustable to vary the period of said unbalance voltages and means manually adjustable for balancing said bridge circuit in various different positions of said transducer and follow-up means.

4. In combination with a sonar device including a directionally sensitive transducer adapted for transmitting recurrent pulses of sound energy, means manually adjustable to vary the pulse repetition rate, apparatus for angularly scanning said transducer back and forth through a sector comprising scan servo means drivingly connected to said transducer, a normally balanced bridge circuit including follow-up means energizingly connected to said servo means and mechanically driven by said servo means in a sense to restore circuit balance, scan control means applying progressive unbalance alternating voltages to said bridge circuit of triangular wave form including means manually adjustable to vary the period of said triangular wave coordinated with said pulse repetition rate adjustable means automatically to increase and decrease said period substantially in proportion to a simultaneous decrease and increase, respectively, effected in said pulse repetition rate.

5. The combination defined in claim 4, and means manually adjustable to vary the mean value of the triangular voltage wave and thereby the average balance position of the follow-up means.

6. In a sonar device of the type having an electro-acoustic transducer adapted to perform back and forth angular scanning through a predetermined sector and to transmit pulses of acoustical wave energy at variable pulse repetition rates, the method of operation comprising manually adjusting pulse repetition rate and concurrently varying the angular scanning rate in substantially inverse relation to the adjusted values of pulse repetition rate.

7. In combination with a propagative wave energy system including a directionally sensitive wave energy transducer, apparatus for angularly scanning said transducer back and forth comprising scan servo means drivingly connected to said transducer, a normally balanced bridge circuit including follow-up means energizingly connected to said servo means and mechanically driven by said servo means in a sense to restore circuit balance, independently operating means continuously generating unbalance voltages varying progressively between maximum and minimum values at a recurrence frequency corresponding to the desired angular scan frequency, and means applying said progressive unbalance voltages to said bridge circuit for effecting back and forth angular scan of said transducer thereby.

8. The combination defined in claim 7, wherein the progressive unbalance voltage generating means comprises a potentiometer having a slide wiper and a winding connected in the bridge circuit, means applying energizing voltage to said winding, and continuously reciprocative drive means automatically reciprocating said wiper back and forth between spaced positional limits on said winding, said wiper being connected electrically to the follow-up means.

9. The combination defined in claim 7, wherein the progressive unbalance voltage generating means comprises a potentiometer having a slide wiper, and a winding connected in the bridge circuit, means applying energizing voltage to said winding, and continuously operative drive means progressively advancing said wiper alternately between maximum and minimum voltage points on said winding, said wiper being connected electrically to the follow-up means.

10. In a sonar device having an electro-acoustic transducer, sector scan means operable to scan said transducer back and forth through a sector angle, means controlling said scan means manually adjustable to vary the angular rate of scan of said transducer, means operable to energize said transducer by energy pulses recurringly, means manually adjustable to vary the pulse repetition rate, and means coordinating adjustments of said first and second manually adjustable means for automatically increasing and decreasing angular scan rate with pulse repetition rate.

11. In a sonar device having an electro-acoustic transducer, means operable for angularly scanning said transducer back and forth comprising scan servo means drivingly connected to said transducer, a normally balanced bridge circuit including a follow-up potentiometer having a winding connected in said bridge circuit and having a wiper energizingly connected to said servo means and mechanically driven by said servo means in a sense to restore bridge circuit balance, a drive control potentiometer having a winding connected in shunt to said follow-up potentiometer winding and having a wiper energizingly connected to said servo means for applying bridge circuit unbalance voltages thereto, independently operating means continuously reciprocating said drive control potentiometer wiper between spaced limits on the winding of said potentiometer, means applying bridge circuit energizing voltage directly across one of said windings, and resistance means and associated selector switch means operable for inserting different values of resistance in said bridge circuit between both ends of one of said windings and the corresponding ends of the other winding, thereby varying the angular scan rate of said transducer effected by said scan servo means independently of the rate of reciprocative movement of said drive control potentiometer wiper.

12. The sonar device defined in claim 11, additionally comprising means operable for applying energizing pulses to the transducer recurringly, means operable to vary the repetition rate of said energy pulses, and means mechanically coordinating said latter means and the selector switch means for increasing and decreasing such pulse repetition rate and the transducer angular scan rate together.

13. The sonar device defined in claim 12, wherein the resistance means comprise paired variable resistance elements and manually operated means for varying the resistance value of one resistance element of a pair oppositely to the variation of the other resistance element of such pair effected simultaneously thereby.

14. The sonar device defined in claim 11, wherein the resistance means comprise paired variable resistance elements and manually operated means for varying the resistance value of one resistance element of a pair oppositely to the variation of the other resistance element of such pair effected simultaneously thereby.

15. A wave propagating scanning system having a transducer, servo-mechanism operable for moving said transducer back and forth to scan a predetermined field, a normally balanced electrical network, detector means responsive to unbalance of said network and controlling energization of said servo-mechanism to move said transducer one way or the other in accordance with the sense of such network unbalance, means interconnecting said servo-mechanism and said network for rebalance of the latter by such energization of said servo-mechanism, and means operating independently of movement effected by said servo-mechanism continuously feeding a slow period reversing voltage into said network at a periodicity corresponding to the desired scanning frequency.

References Cited in the file of this patent

UNITED STATES PATENTS

| | | |
|---|---|---|
| 2,680,223 | Hammett | June 1, 1954 |
| 2,776,396 | Gille et al. | Jan. 1, 1957 |